(12) United States Patent
Endres et al.

(10) Patent No.: US 11,148,459 B2
(45) Date of Patent: Oct. 19, 2021

(54) CARD-SHAPED DATA CARRIER WITH NATURAL MATERIALS, METHOD AND DEVICE FOR THE PRODUCTION THEREOF

(71) Applicant: GIESECKE+DEVRIENT MOBILE SECURITY GMBH, Munich (DE)

(72) Inventors: Günter Endres, Munich (DE); Thomas Tarantino, Laufen (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 134 days.

(21) Appl. No.: 16/331,253

(22) PCT Filed: Sep. 4, 2017

(86) PCT No.: PCT/EP2017/001043
§ 371 (c)(1),
(2) Date: Mar. 7, 2019

(87) PCT Pub. No.: WO2018/046123
PCT Pub. Date: Mar. 15, 2018

(65) Prior Publication Data
US 2019/0217653 A1    Jul. 18, 2019

(30) Foreign Application Priority Data

Sep. 7, 2016    (DE) ..................... 10 2016 010 864.9

(51) Int. Cl.
*B32B 3/08*        (2006.01)
*B32B 9/00*        (2006.01)
(Continued)

(52) U.S. Cl.
CPC ................ *B42D 25/47* (2014.10); *B32B 9/00* (2013.01); *B42D 25/20* (2014.10); *B42D 25/36* (2014.10);
(Continued)

(58) Field of Classification Search
CPC ........ B42D 25/47; B42D 25/36; B42D 25/20; B44C 5/043; B44C 5/0438; B44C 5/06;
(Continued)

(56) References Cited

U.S. PATENT DOCUMENTS 5,581,065 A * 12/1996 Nishikawa ........... G06K 19/072
235/487
2005/0216350 A1    9/2005 Aibazov et al.
(Continued)

FOREIGN PATENT DOCUMENTS

DE    202010002106 U1    6/2010
EP    2193897 A1    6/2010
(Continued)

OTHER PUBLICATIONS

German Search Report from DE Application No. 102016010864.9, dated Jul. 13, 2017.
(Continued)

*Primary Examiner* — Justin V Lewis
(74) *Attorney, Agent, or Firm* — Workman Nydegger (57) ABSTRACT

The present invention is directed at a method for manufacturing a card-shaped data carrier, in which a material from nature, for example wood, is installed in a particularly advantageous manner. The invention is further directed at a correspondingly adapted apparatus for manufacturing the card-shaped data carrier as well as at the data carrier itself. Further, a computer program product is proposed, having control commands that implement the method and/or operate the proposed apparatus.

14 Claims, 4 Drawing Sheets

(51) Int. Cl.
*B32B 7/12* (2006.01)
*B32B 9/04* (2006.01)
*B32B 18/00* (2006.01)
*B32B 21/04* (2006.01)
*B42D 25/47* (2014.01)
*B44C 5/04* (2006.01)
*B42D 25/36* (2014.01)
*B44C 5/06* (2006.01)
*B42D 25/20* (2014.01)

(52) U.S. Cl.
CPC ............ *B44C 5/043* (2013.01); *B44C 5/0438* (2013.01); *B44C 5/06* (2013.01); *B32B 2425/00* (2013.01)

(58) Field of Classification Search
CPC ......... B32B 9/00; B32B 2425/00; B32B 3/08; B32B 9/002; B32B 7/12; B32B 9/04; B32B 18/00; B32B 21/042
USPC ................... 283/67, 70, 72, 83, 94, 98, 901
See application file for complete search history.

(56) References Cited

U.S. PATENT DOCUMENTS

2009/0294543 A1    12/2009  Varga et al.
2013/0287267 A1*   10/2013  Varone .................. G06K 19/18
                                                            382/115
2015/0298429 A1    10/2015  Ricketts et al.

FOREIGN PATENT DOCUMENTS

| JP | H01152094 A | 6/1989 |
| WO | 9623276 A1 | 8/1996 |
| WO | 2015051867 A1 | 4/2015 |
| WO | 2015179639 A1 | 11/2015 |

OTHER PUBLICATIONS

International Search Report from PCT Application No. PCT/EP2017/001043, dated Dec. 1, 2017.

* cited by examiner

CARD-SHAPED DATA CARRIER WITH NATURAL MATERIALS, METHOD AND DEVICE FOR THE PRODUCTION THEREOF

BACKGROUND

The present invention is directed at a method for manufacturing a card-shaped data carrier, in which a material from nature, for example wood, is installed in a particularly advantageous manner. The invention is further directed at a correspondingly adapted apparatus for manufacturing the card-shaped data carrier and at the data carrier itself. Further, a computer program product is proposed, with control commands that implement the method and/or operate the proposed apparatus.

WO 2015/051867 A1 shows a method for manufacturing a portable data carrier, wherein at least one first plastic foil is employed for manufacturing the data carrier, wherein the at least one first plastic foil is coated with adhesive, folded and bonded to form a composite, wherein the data carrier is punched out from the composite.

DE 20 2010 002106 U1 shows a card-shaped data carrier, which can be used as an identity document or for authorization checks, and which is formed of a laminate layer structure, wherein the individual laminate layers in each case consist of real wood and the extension of the wood fibers of adjacent wood layers is oriented in different directions.

EP 2 193 897 A1 shows a composite material based on a wood veneer, wherein the wood veneer having a layer thickness of 0.2 to 1.5 mm is connected to a tear-resistant film at least on one side by means of an adhesive.

While conventional card-shaped data carriers, for example credit cards, are manufactured from plastic materials, various financial services providers offer credit cards which are finalized in particularly refined manner. For example, it is known to issue credit cards to customers, which are manufactured from metal and are thus distinguishable from typically employed credit cards. In this case, it is frequently not only the quality of the credit card per se that is in the foreground, but rather it is intended to create a unique feature for individual, for example particularly solvent, customers.

For this purpose, it is also known to supply credit cards which have a wood structure on at least a part of the surface. This can be manufactured in such a manner that real wood is actually installed, or else the plastic is shaped in such a manner that it has a wood-like surface structure and coloration. In this case, however, it is particularly disadvantageous that these credit cards are manufactured according to conventional methods, which typically provide for several layers to be placed above one another and laminated together. This lamination is particularly harmful to the materials from nature employed, wherein a change of the material can occur during hot lamination. Under the influence of the heat, it is particularly disadvantageous that the individual layers can become irregular or bulge.

There are various publications on the manufacture of such cards with materials from nature, which propose, for example, to simulate the character of the materials employed by means of a printing technology. The process of manufacturing these cards is very complex and, owing to the brittle, hard character of the materials used does not fulfill the existing ISO requirements in every case. In addition, the typical character of these materials does not come to bear sufficiently, particularly in the case of card configurations simulating the natural character by means of printing techniques Further, it is disadvantageous in accordance with conventional methods that the materials from nature used are frequently not bending resistant and can therefore break when the respective credit card is heavily loaded. Thus, it can respectively be the case that a credit card is already unusable after the manufacturing process, since the material from nature employed is either broken or is deformed due to the action of heat of the lamination of the layers and/or has an undesired coloration. Further, problems with installed electronic elements, which supply a functionality of the credit card, typically occur according to conventional methods.

SUMMARY

It is therefore an object of the present invention to propose a method for manufacturing a card-shaped data carrier, which makes it possible to install materials from nature in the data carrier in an aesthetically pleasing and stable manner with little technical effort. Further, it is an object of the present invention to supply a corresponding value document or card-shaped data carrier and an apparatus for producing such a data carrier. In addition, it is an object of the present invention to supply a computer program product, which has control commands that implement the method and/or operate the proposed apparatus.

This object is achieved by a method having the features of patent claim 1. Further advantageous embodiments are stated in the subclaims.

Accordingly, a method is proposed for manufacturing a card-shaped data carrier or value document with natural materials. Here, a card-shaped carrier layer is supplied and a card-shaped decorative layer is supplied, wherein the decorative layer has a natural material and is adhesively bonded onto the carrier layer.

A card-shaped data carrier can generally be a value document, for example a credit card, a personal identification card, a driver's license, a health insurance card or generally an identification card. The data carrier can be adapted here to supply data in such a manner that said data are applied merely superficially to the data carrier, for example by means of printing technologies or similar technologies. Further, however, it is also possible to provide electronic components which store data together with electronic components which process or supply said data. According to the invention, it is thus advantageous that the proposed card-shaped data carrier and/or the method for manufacturing the card-shaped data carrier make it possible to continue employing conventional information items or security features. Thus, a security feature can also be introduced into the proposed card-shaped data carrier, for example on the proposed decorative layer.

When a card-shaped carrier layer is supplied, this can be a layer such as typically installed in conventional credit cards. For this purpose, for example, several plastic layers are stacked or placed above one another and laminated together. Thus, the card-shaped carrier layer can represent at least a part of a card body of a conventional credit card. It is particularly advantageous here to configure the card-shaped carrier layer to be thinner than known credit cards, since an adhesive layer and a decorative layer are to be provided on the supplied carrier layer in additive manner.

It is also advantageous to already introduce electronic components as required into the card-shaped carrier layer and to laminate said components at least partially. Thus, some components can already be arranged in the carrier layer, but can also be arranged in the decorative layer.

Further, it is possible for the components to be arranged in such a manner that said components are installed both in the carrier layer and in the decorative layer, breaking through the adhesive layer. Thus, at least one electronic component can be arranged partially in the carrier layer, wherein the other part of the electronic component is installed in the decorative layer. The carrier layer and the decorative layer thus enclose the electronic component.

Further, a card-shaped decorative layer is supplied that has a natural material. Any material from nature is considered to be a natural material here, wherein said material from nature can be present in the decorative layer over the entire area, or else only particles thereof. Consequently, it is possible for the decorative layer to be formed entirely of the material from nature, or else for the material from nature to be processed into fibers or generally partial pieces and to be introduced into the decorative layer. Further, according to one aspect of the present invention, it is also possible to configure the decorative layer such that several materials from nature are used. Thus, for example, it is possible to manufacture one part of the decorative layer completely from wood and a further part from a metal or stone. The person skilled in the art knows further natural materials which can be installed according to the invention.

Further, the decorative layer, which has a natural material, is adhesively bonded onto the carrier layer. This is particularly advantageous in comparison with known methods, since deformations of the respective layers cannot occur. As has been discussed at the outset, according to conventional methods, it is customary for the individual layers to be applied by lamination and then to be punched out. According to the invention, however, an adhesive layer is introduced between the decorative layer and the carrier layer, or the decorative layer is adhesively bonded to the carrier layer. Thus, not only a bulging or a deformation of the respective layers is avoided, but rather the introduced adhesive layer per se offers a particular protection for the proposed card-shaped data carrier. Thus, for example, the adhesive layer can be configured flexibly in such a manner that, if the credit card is bent, the adhesive layer is correspondingly deformed and thus prevents the further materials or further layers from breaking or tearing. The adhesive layer thus represents a certain buffer which cushions or minimizes loads on the card-shaped data carrier. Thus, according to the invention, it is also avoided that the individual layers of the card body are laminated onto one another in a fixed manner, but rather, these layers form a flexible unit, which also yields when the card-shaped data carrier is bent. According to the invention, a particularly stable, breaking-resistant and flexible data carrier is thus supplied.

According to one aspect of the present invention, the carrier layer has at least one functional element from a group of elements, the group comprising a magnetic strip, a chip module, a signature strip, a coil, a memory and/or a circuit. This has the advantage that, for example, the carrier layer, but also the decorative layer, can each receive different functional components. Thus, for example, in the case of smart cards, i.e. a card-shaped data carrier, various electronic components are installed which supply a functionality. In this case, it is particularly advantageous that these electronic components can be arranged in the carrier layer, since the carrier layer can be manufactured according to conventional methods. For example, when layers within the carrier layer are laminated together, thus, these electronic components can already be inserted into the individual layers and can be laminated together in such a manner that the carrier layer according to the invention is created. Thus, it is also possible to continue employing conventional methods for manufacturing a card body and to merely adjust these methods in such a manner that the card body is configured to be thinner, so that it is possible to adhesively bond a decorative layer thereon. The method according to the invention can thus be implemented with little technical effort, and conventional manufacturing machines merely have to be adjusted according to the invention.

According to a further aspect of the present invention, the carrier layer comprises several plies which are laminated together. This has the advantage that the carrier layer can be supplied in accordance with conventional methods and, according to the invention, merely has to be equipped with the card-shaped decorative layer having a natural material. Thus, while it is possible to supply the carrier layer by means of lamination, this does not mean that the decorative layer is likewise laminated on. Rather, it is advantageous according to the invention that the decorative layer is adhesively bonded, and the carrier layer is employed for this purpose only as a blank which is upgraded according to the invention.

According to a further aspect of the present invention, the carrier layer has functional elements which are introduced into the carrier layer respectively before or after a lamination. This has the advantage that the electronic components, which supply a functionality of the card-shaped data carrier, can be integrated by lamination, or else can be introduced into the card body after lamination. For example, it is thus possible to first supply the carrier layer, to then introduce depressions into the carrier layer and to further place the decorative layer on top. Further, according to the invention, it is possible to introduce the functional elements at least partially into the decorative layer, whereas recesses are provided in the carrier layer. The decorative layer can thus be fitted into the carrier layer together with the electronic elements, so that even in the case of electronic components that protrude from the decorative layer, the decorative layer rests on top of the carrier layer in a form-fitting manner. An adhesive layer has to be provided here merely between the decorative layer and the carrier layer. In general, however, this adhesive layer does not have to be formed continuously. This means that the adhesive layer acts on at least a part of the interior side of the carrier layer and of the interior side of the decorative layer.

According to a further aspect of the present invention, the decorative layer is configured in a film-like manner. This has the advantage that a particularly thin adhesive layer is provided which broadens the card body only minimally and, in particular, makes it possible for the decorative layer to likewise be configured similarly, in such a manner that merely such a thickness of the card body is obtained that corresponds to a conventional card. Thus, the decorative layer is configured to be particularly thin and can thus amount to only several micrometers.

According to a further aspect of the present invention, the decorative layer is configured to be flexible. This has the advantage that, even in the event of strong loads of the card-shaped data carrier, the decorative layer does not tear or break, which is possible in particular since the decorative layer can be configured in a film-like manner. The decorative layer can thus be either bent or compressed and ensures that no cracks or breaks occur on the card surface.

According to a further aspect of the present invention, the decorative layer is provided as a thin-film veneer. This has the advantage that manufacturing machines already conventional in other domains can be used, and the supplied carrier layer can be coated or pasted. Thus, thin-film veneers from other domains are already known, wherein according to the invention it has surprisingly been found that such thin-film veneers are also suitable for coating or for being pasted on card bodies. Such thin-film veneers are used merely in large-area application scenarios. However, the use thereof is also particularly advantageous in the context of the present invention, since an already tested method can thus be used with little technical effort.

According to a further aspect of the present invention, the adhesive bonding is carried out by means of a pressure-sensitive adhesive. This has the advantage that the decorative layer can be configured in such a manner that it is coated with the pressure-sensitive adhesive and the decorative layer can thus be pressed with the carrier layer in a particularly simple manner. It is thus possible to supply the decorative layer with the pressure-sensitive adhesive already before a production process, and to activate the pressure-sensitive adhesive merely during the manufacturing process of the card-shaped data carrier, so that the decorative layer is adhesively bonded to the carrier layer.

According to a further aspect of the present invention, the pressure-sensitive adhesive forms a flexible adhesive layer between the carrier layer and the decorative layer. This has the advantage that the data carrier supplied is flexible and it is thus prevented that the natural materials of the decorative layer tear or break. The adhesive layer thus functions as a buffer which cushions loaded forces.

According to a further aspect of the present invention, the carrier layer and/or the decorative layer has at least one cavity for receiving an electronic component. This has the advantage that any type of cavities is to be provided either in the carrier layer and/or in the decorative layer. A cavity is not to be understood as limiting here, but rather the average person skilled in the art will understand that these can be recesses on the surface of at least one of the two layers. Thus, the respective electronic component can actually be introduced into the carrier layer or the decorative layer, but the electronic component can also protrude from the carrier layer or the decorative layer and penetrate into the respectively opposite layer.

According to a further aspect of the present invention, the natural material is present as wood, metal, ceramic or stone. This has the advantage that novel materials are provided for this domain with regard to the manufacture of card-shaped data carriers, which novel materials are combined in a particularly advantageous manner according to the invention to form a card body. The person skilled in the art recognizes here that further natural materials can be used according to the invention. A natural material is a material from nature here, i.e. a material that is not produced by manufacturing processes, for example chemical manufacturing processes. Thus, for example, precious metals or the like can also be employed. In particular, it is possible to mix the individual materials in such a manner that at least one first part is formed of a first material and a second part of the decorative layer is formed of a second material. Further, it is also possible to process the natural materials in such a manner that they can merge into one another. Thus, for example, the wood can be broken down into individual fibers or pieces and at least one further material can be introduced while so doing. However, it is preferred to install the natural material respectively on its own per card-shaped data carrier.

According to a further aspect of the present invention, the carrier layer has a thickness of approximately 500-700 µm, the decorative layer has a thickness of approximately 100-300 µm and/or the adhesive layer has a thickness of approximately 10-100 µm. This has the advantage that, despite the construction according to the invention, the expected gauge or thickness of a conventional credit card is maintained. In particular, it is possible for the carrier layer to be configured in such a manner that the thickness thereof makes possible a certain stability to the card or the card-shaped data carrier, while the decorative layer can be configured to be particularly thin according to the invention. According to the invention, a particularly flexible card is thus created, since the decorative layer can be configured to be particularly thin and thus the natural materials employed do not tend to break or tear. It has surprisingly been found here that the particular thickness of the proposed decorative layer of 100-300 µm is particularly advantageous, since said thickness is sufficiently thick to reflect the structure of the natural material, but is nevertheless thin enough to make possible a flexible and tear-resistant construction to the card. Further, it has been found particularly surprisingly that a thickness of 10-100 µm of the adhesive layer is already sufficient to connect the decorative layer to the carrier layer in a sufficiently firm manner.

The object is also achieved by an apparatus for manufacturing a card-shaped data carrier with natural materials, adapted to supply a card-shaped carrier layer and to supply a card-shaped decorative layer, wherein the decorative layer has a natural material and is adhesively bonded onto the carrier layer.

The object is also achieved by a card-shaped data carrier with natural materials, with a card-shaped carrier layer and a card-shaped decorative layer, wherein the decorative layer has a natural material and is adhesively bonded onto the carrier layer.

The object is further achieved by a computer program product with control commands that implement the proposed method and/or operate the proposed apparatus for manufacturing the card-shaped data carrier.

It is particularly advantageous here that the card-shaped data carrier can be configured in such a manner that the individual method steps configure structural features of said card-shaped data carrier. Further, it is possible to operate the proposed tool or apparatus for manufacturing the data carrier using the proposed method, in such a manner that the method steps can be reproduced in accordance with structural features in the apparatus. In particular, it is advantageous that the apparatus has structural features which can supply the proposed card-shaped data carrier.

BRIEF DESCRIPTION OF THE DRAWINGS

Further advantageous embodiments are explained in more detail with reference to the attached figures. The figures are described as follows.

DETAILED DESCRIPTION OF VARIOUS EMBODIMENTS

Figure 1A:
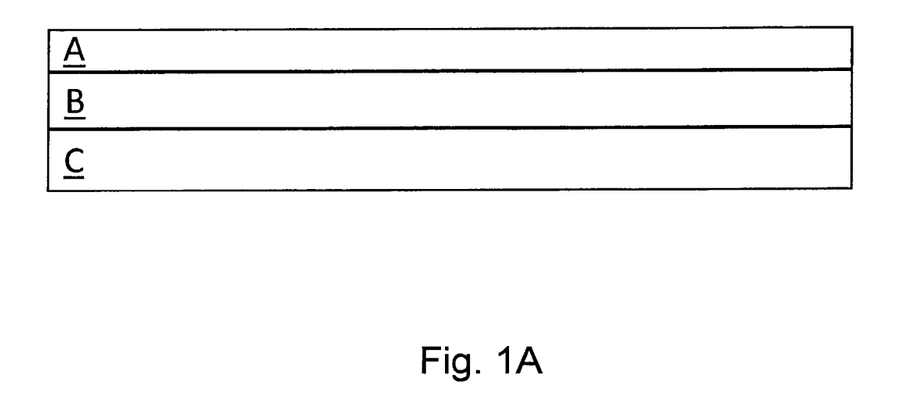
FIG. 1A/1B: a layer structure of a card-shaped data carrier according to a known method.
Figure 1B:
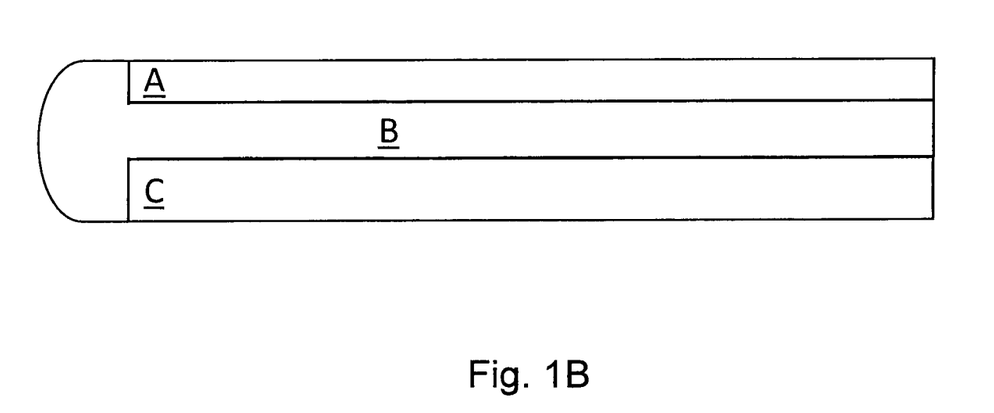

FIG. 1A shows a cross section of a card-shaped data carrier as an initial situation of the present invention. The challenge here is to combine new, innovative materials on one side of the card with standard PVC materials on the other side of the card. The embodiment variants shown in FIGS. 1A and 1B are shown with corresponding material combinations. The layer A is formed as a novel material here, wherein the layer is manufactured, for example, from plastic or PVC. In addition to the personalization, the layer A is also intended to receive an EMC chip. The PVC shown has to receive elements such as magnetic strips, signature strips and holograms in addition to the personalization.

The arrangements or layer models shown are particularly disadvantageous; in the construction shown in FIG. 1A, the lamination and punching of a card made of the two materials is provided, with the disadvantage that the subsequent application of elements such as signature strips or holograms by means of hot-stamp technology is not possible due to the non-planar surface of the materials from nature used on the opposite side. In this case, a so-called "pre-patched" hologram or signature strip would have to be worked with. In addition, due to the different material properties, a bulging of the card as a result of the lamination process is to be expected.

The construction shown in FIG. 1B provides a carrier in the core of the card structure for receiving, on the one hand, different materials from nature on the front side and, on the other hand, PVC on the back side of the card. This is very complex, since a total of three different assemblies or components are required for manufacturing the card. Such a carrier, as provided in layer B, is to be avoided, since said carrier unnecessarily reinforces the card and, in addition, represents a further component which in turn has to be kept in store and processed technically.

Further, such arrangements, as are already known, are connected to a high metal content and are partially non-ISO-compliant. There are thus limitations with regard to the employability of alternative, innovative, natural materials. These disadvantages are overcome according to the invention, for example by means of the proposed method and/or card-shaped data carrier, as is shown in FIG. 2.

Figure 2:
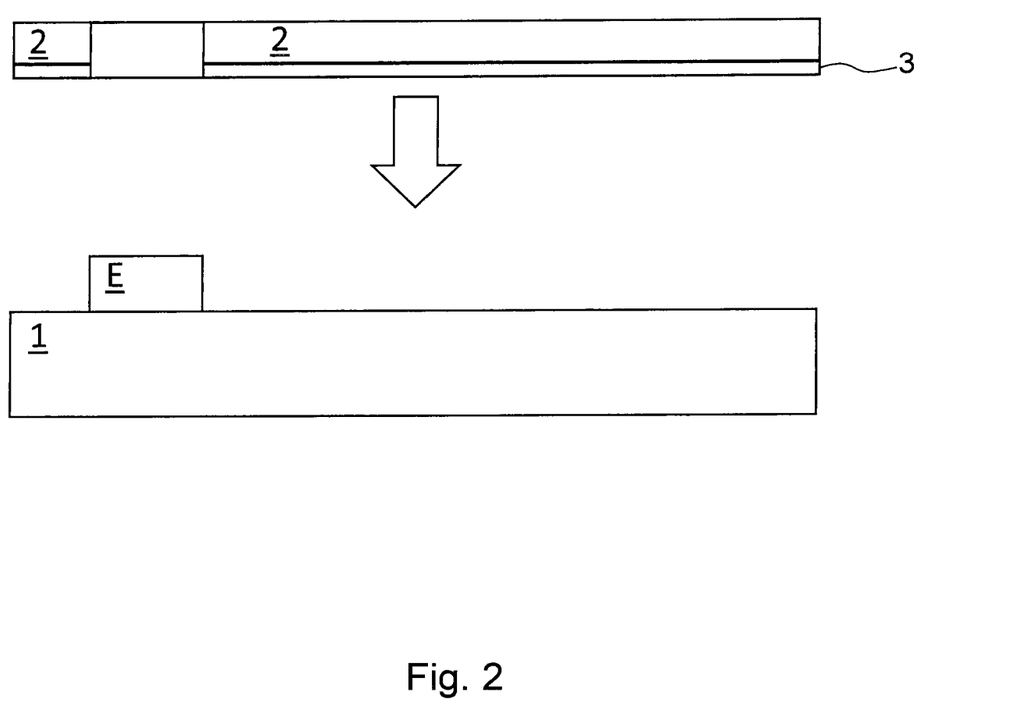
FIG. 2: a card-shaped data carrier with natural materials according to one aspect of the present invention.

FIG. 2 shows a card-shaped document or card-shaped data carrier according to one aspect of the present invention. A first component 1 is provided here, which functions as a carrier layer 1, and a second component 2, which functions as a decorative layer. An adhesive layer 3, which connects the decorative layer 2 to the carrier layer 1, is arranged therebetween.

Further, a component E is provided, for example an electronic component, which provides a functionality of the data carrier. For example, the electronic component E can be a chip module, i.e. a circuit, or else a memory, a display or a fingerprint sensor. The person skilled in the art knows further electronic components which are to be kept in store according to the invention. This can also be, for example, a coil which serves for the power supply by means of induction of the further electronic components E.

According to the invention, an optimized, expanded method for manufacturing the card-shaped data carrier is proposed, comprising, for example, the following steps:
1. Manufacture of a first component or assembly 1 based on known materials such as PVC, PC, PETG or other plastics having two different functional sides by means of known fabrication technologies such as, for example, laminating and/or adhesive bonding in the known ISO card formats. In this case, a functional side can be provided which has a design and all known functional elements such as magnetic strips, chip modules, signature strips and the like, which can be applied after or already before laminating, as well as a further functional side which functions as a receiving side or carrier for a second component or assembly and/or with already installed, contact-type chip modules. The gauge or the thickness of this carrier layer 1 can amount to, for example, 500-700 µm.
2. Manufacture of a second, film-like component or assembly 2 based on innovative materials such as, for example, wood, metal, ceramic, stone and the like, having flexible properties (thin-film veneer having plastic-like properties), a final surface structure and, if required, a cavity for receiving a contact-type chip module in the known ISO card formats. The gauge or thickness of such a decorative layer 2 can amount to, for example, around 100-300 µm.
3. A connection of the first component to the second component via, for example, flexible pressure-sensitive adhesives or a TPU layer applied to the second component. This is comparable to the principle of applying an adhesive label or sticker to a substrate surface. The thickness of the adhesive layer or the gauge of the adhesive layer can be around 10-100 µm.

This has the advantage that a high degree of freedom exists with regard to the use of new, innovative materials, i.e. materials from nature. The combination of different, innovative materials from nature is possible using standard materials which do not have to be manufactured in separate manufacturing processes. Further, there is a high flexibility of the connection between the assembly 1 and the assembly 2, i.e. between the carrier layer 1 and the decorative layer 2. This high flexibility is thus also transferred to the end product, namely to the proposed credit card or the card-shaped data carrier.

FIG. 2 shows an aspect of the present invention with a chip module on the side of the new, innovative card material, namely the material from nature, before connecting component 1 to component 2, i.e. the carrier layer 1 to the decorative layer 3. For this purpose, an electronic component E, for example a contact chip, is attached on the first component, and a recess is provided in the second component, i.e. the decorative layer 2, in which the electronic component E is fitted in a form-fitting manner. The adhesive layer 3 is thus also interrupted at least in this place. Also shown in FIG. 2 is an areally shaped adhesive layer 3 which connects the component 1 to the component 2. Thus, according to the invention, it is possible to supply the component 1, i.e. the carrier layer 1, and the component 2, i.e. the decorative layer 2, separately, wherein a conventional carrier layer can also be resorted to with regard to the component 1. Only in the manufacturing process according to the invention are the components joined together in such a manner that the proposed value document or card-shaped data carrier is created.

Thus, it is shown in FIG. 2 that the respective layers 1 and 2 are still separated, and are joined and/or adhesively bonded only in subsequent method steps.

Figure 3:
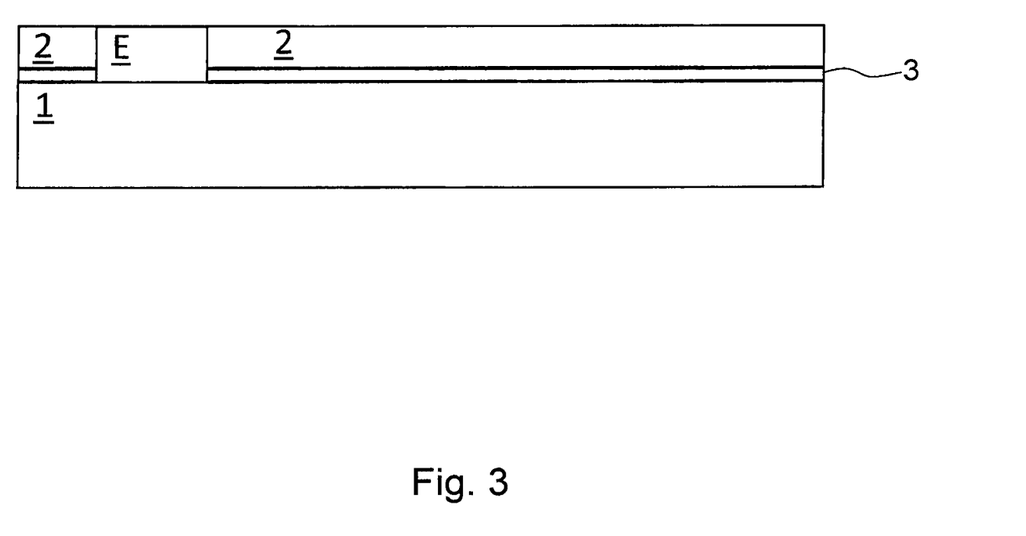
FIG. 3: a card-shaped data carrier with natural materials according to a further aspect of the present invention.

FIG. 3 shows a card-shaped data carrier with natural materials according to one aspect of the present invention. The data carrier comprises a card-shaped carrier layer 1 and a card-shaped decorative layer 2, wherein the decorative layer 2 has a natural material and is adhesively bonded onto the carrier layer 1.

Further, it is shown in FIG. 3 that the electronic component E is introduced into the decorative layer 2 in a form-fitting manner. Said component is a contact chip, for example, which requires physical contact with a further component in order to exchange data. This is achieved according to the invention in such a manner that the surface of the decorative layer is broken up, and the contact is introduced into the decorative layer in a form-fitting manner such that said layer can be contacted or touched from outside the card-shaped data carrier.

Figure 4:
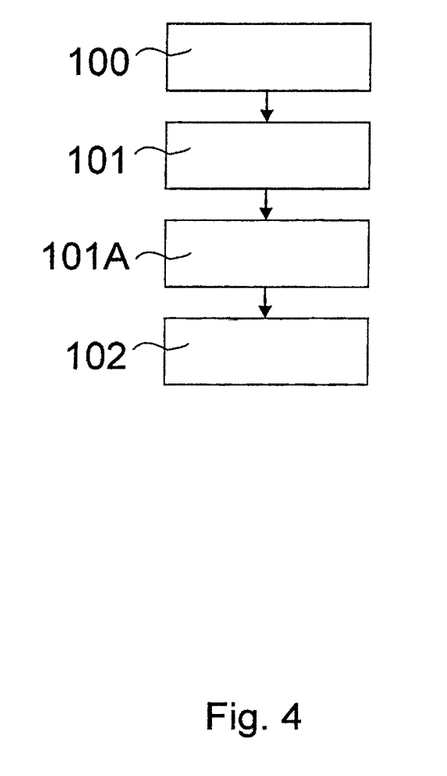
FIG. 4: a method for manufacturing a card-shaped data carrier according to one aspect of the present invention.

FIG. 4 shows a method for manufacturing a card-shaped data carrier with natural materials, with the steps of supplying 100 a card-shaped carrier layer 1 and supplying 101 a card-shaped decorative layer 2, wherein the decorative layer 2 has at least one natural material and is adhesively bonded 102 onto the carrier layer 1. The person skilled in the art recognizes here that further method steps can be provided, and in particular that the method steps can be carried out iteratively and/or in a different order. Further, it can be provided that the supplying 100 of the card-shaped carrier layer 1 comprises a lamination 101A.

The invention claimed is:

1. A method for manufacturing a data carrier with natural materials, with the steps of:
   supplying a carrier layer; and
   supplying a decorative layer,
   wherein the decorative layer has at least one natural material and is adhesively bonded onto the carrier layer by an adhesive layer;
   wherein the carrier layer has a thickness of 500-700 µm, the decorative layer has a thickness of 100-300 µm and/or the adhesive layer has a thickness of 10-100 µm, such that said data carrier with natural materials is flexible and tear-resistant.

2. The method according to claim 1, wherein the carrier layer has at least one functional element from a group of elements, the group comprising: a magnetic strip, a chip module, a signature strip, a coil, a memory and/or a circuit.

3. The method according to claim 1, wherein the carrier layer comprises a plurality of plies which are laminated together.

4. The method according to claim 1, wherein the carrier layer has functional elements which are introduced into the carrier layer respectively before or after a lamination.

5. The method according to claim 1, wherein the decorative layer is configured having a thickness of 100-300 µm.

6. The method according to claim 1, wherein the decorative layer is configured to be flexible.

7. The method according to claim 1, wherein the decorative layer is supplied as a thin-film veneer.

8. The method according to claim 1, wherein the adhesive bonding is effected by means of a pressure-sensitive adhesive.

9. The method according to claim 8, wherein the pressure-sensitive adhesive forms the adhesive layer between the carrier layer and the decorative layer, the adhesive layer being a flexible adhesive layer.

10. The method according to claim 1, wherein the carrier layer and/or the decorative layer has at least one cavity for receiving an electronic component.

11. The method according to claim 1, wherein the natural material is present as wood, metal, ceramic or stone.

12. A computer program product with control commands that implement the method according to claim 1.

13. An apparatus for manufacturing a data carrier with natural materials, adapted to:
   supply a carrier layer; and
   supply a decorative layer,
   wherein the decorative layer has at least one natural material and is adhesively bonded onto the carrier layer by an adhesive layer,
   wherein the carrier layer has a thickness of 500-700 µm, the decorative layer has a thickness of 100-300 µm and/or the adhesive layer has a thickness of 10-100 µm, such that said data carrier with natural materials is flexible and tear-resistant.

14. A data carrier with natural materials, having:
   a carrier layer; and
   a decorative layer,
   wherein the decorative layer has at least one natural material and is adhesively bonded onto the carrier layer by an adhesive layer,
   wherein the carrier layer has a thickness of 500-700 µm, the decorative layer has a thickness of 100-300 µm and/or the adhesive layer has a thickness of 10-100 µm, such that said data carrier with natural materials is flexible and tear-resistant.

* * * * *